US006207761B1

(12) United States Patent
Smith et al.

(10) Patent No.: US 6,207,761 B1
(45) Date of Patent: Mar. 27, 2001

(54) IONOMER/RUBBER/POLYOLEFIN BLEND AND USES THEREOF

(75) Inventors: Dennis C. Smith, Akron; Anita Shah, Stow, both of OH (US); Alain C. Adam, Troy, MI (US); Roy H. Kinsey, Fountain Hills, AZ (US); Brian D. Fairchild, Cuyahoga Falls, OH (US)

(73) Assignee: A. Schulman, Inc., Akron, OH (US)

( * ) Notice: Subject to any disclaimer, the term of this patent is extended or adjusted under 35 U.S.C. 154(b) by 0 days.

(21) Appl. No.: 09/271,776

(22) Filed: Mar. 18, 1999

(51) Int. Cl.$^7$ ...................................... C08L 33/02
(52) U.S. Cl. ......................... 525/221; 525/195; 525/196; 525/201; 525/15; 525/78
(58) Field of Search ..................... 525/221, 195, 525/196, 201, 15, 78

(56) References Cited

U.S. PATENT DOCUMENTS

| | | | |
|---|---|---|---|
| 4,371,583 | 2/1983 | Nelson | 525/221 |
| 4,871,810 | 10/1989 | Saltman | 525/221 |
| 4,968,752 | 11/1990 | Kawamoto et al. | 525/221 |
| 5,206,294 | 4/1993 | Dawson | 525/221 |
| 5,721,314 | * 2/1998 | Hausmann | 525/78 |

OTHER PUBLICATIONS

DuPont Industrial Polymers: Surlyn® 9650 Technical Data Sheet—Nov. 20, 1998.
DuPont Industrial Polymers: Surlyn® 9520 Technical Data Sheet—Nov. 20, 1998.
DuPont Industrial Polymers: Surlyn® 9020 Technical Data Sheet—Nov. 20, 1998.
Engage® 8100 for General Purpose Elastomeric or Thermoset Wire and Cable Applications—Technical Date Sheet—Apr. 1, 1996.
Information About Dow Corning® MB50–001 Silicone Masterbatch—Technical Data Sheet—1996.
Blendex® Typical Properties, Blendex 338, D190–1–795, GE Specialty Chemicals—Technical Data Sheets—1996.
Stereon® 841A, Firestone Synthetic Rubber and Latex Company—Technical Data Sheet—Aug. 1996.
Chemigum P86F, Goodyear Product Specification—Nov. 1996.
Rubber Concentrates Preliminary Product Data Sheet, RC 8001, Advanced Elastomer Systems—Jul. 1997.
EPON® Resin 1002F, Technical Bulletin, Shell Chemical Company—Sep. 1992.
Exxon Chemical: Iotek® Ionomers, Iotek 7010 Ionomer Molding/Extrusion Resin Technical Data Sheet—Jul. 1998.
Exxon Chemical: Iotek® Ionomers, Iotek 7020 Ionomer Molding/Extrusion Resin Technical Data Sheet—Jul. 1998.
Exxon Chemical: Iotek® Ionomers, Iotek 7030 Ionomer Molding/Extrusion Resin Technical Data Sheet—Jan. 1996.

* cited by examiner

Primary Examiner—James J. Seidleck
Assistant Examiner—Olga Asinovsky
(74) Attorney, Agent, or Firm—The Firm of Hueschen and Sage

(57) ABSTRACT

A thermoplastic ionomer blend or alloy exhibiting advantageous properties upon molding or extrusion and/or thermoforming, consisting essentially of the following components:

A. about 15 to 85 parts by weight of a thermoplastic copolymer containing about 91 to 80 weight percent of alpha-olefin units and about 9 to 20 weight percent of alpha, beta-ethylenically unsaturated carboxylic acid units said carboxylic acid units being about 20 to 90 percent neutralized with metal ions, preferably zinc, B. about 10 to 80 parts by weight of a rubber, preferably a thermoplastic elastomer selected from the group consisting of (a) crosslinked ethylene-propylene-diene copolymers and equivalent polyolefin copolymers such as ethylene-butene, hexene, or octene, (b) acrylonitrile-butadiene copolymers, (c) styrene-butadiene copolymers, and (d) styrene acrylonitrile graft-crosslinked butadiene rubbers, and C. about 5 to 40 parts by weight of a thermoplastic polymer selected from the group consisting of polyethylene and polypropylene copolymers and homopolymers, the total number of parts being 100, and molded or extruded and/or thermoformed products produced from the same.

32 Claims, No Drawings

IONOMER/RUBBER/POLYOLEFIN BLEND AND USES THEREOF

FIELD OF THE INVENTION

The present invention relates to a thermoplastic polymer blend or alloy comprising an ionomer, a rubber which is preferably a cross-linked ethylene-propylene-diene elastomer, and a polypropylene or polyethylene homopolymer or copolymer, which blend exhibits numerous advantageous characteristics and properties in its various use applications, such as in injection molding or extrusion and thermoforming.

BACKGROUND OF THE INVENTION

A number of polymers and polymer blend compositions have been developed over the years for fabricated articles such as grips, handles, push buttons, auto arm rests, cable jackets, decorative trim profiles, and extruded sheet laminates for tarpaulins, seat covers, and automotive instrument panel skins. Plasticized polyvinyl chloride (P-PVC), thermoplastic polypropylene and/or polyethylene olefin elastomer blends (TPO), and polyurethanes (PUR) have been extensively employed for these applications. Each of these blends, due to inherent composition shortcomings, have shown deficiencies as to weatherability, mar resistance, and recyclability in these applications.

The current design technology for instrument panels involves foam-in-place or foam placement techniques, in which a P-PVC or PUR or TPO skin is vacuum formed or slush molded, a separate structural substrate is molded of a styrenic or olefin resin, and a polyurethane or olefin foam is injected or positioned into the gap between the skin and the instrument panel structure.

The product primarily utilized within the automotive industry for instrument panel skins is P-PVC. Many attempts have been made in the past with only limited success, and intensive efforts still continue, to displace plasticized P-PVC. The requirements for this application include resistance to abrasion wear, heat deformation, and ultraviolet degradation, as well as low volatile migration and the capability of replicating desired finishes with long-term grain retention. Additionally, compositions for components such as instrument panel cover stock must be colorable and of a gloss level so as not to cause glare or reflectance which will detract from the vision of the driver. To define an acceptable surface, the industry uses both a visual inspection and a quantitative measure of the reflective gloss of an extruded sheet. Moreover, the instrument panel skin material should be compatible with the substrate, i.e., foam and/or structural components of the instrument panel, to enhance recyclability.

The predominant instrument panel skin material, P-PVC, possesses the recognized disadvantage of volatile plasticizer migration. Instrument panel skins made from PVC must be plasticized to provide appropriate softness. However, plasticizers are somewhat volatile, due to their low molecular weight and, as the part ages within the interior of the car, the volatile plasticizer deposits on the windshield and other interior surfaces. This deposit is commonly referred to as "fogging", and as such is found to be undesirable. In addition, migration of the plasticizer from the P-PVC leads to long-term embrittlement of the material and loss of function. Therefore, in many instances the P-PVC skin is coated to control gloss levels, adding additional expense to the manufacturing cost. Its most notable disadvantage is that of disposal and recycling. Typically, it is not compatible with the foam substrate or structural component materials of the instrument panels, and as such is not conducive to recycling. This normally bonded structure of dissimilar materials necessitates incineration, resulting in the production of hydrogen chloride and heavy metals as a by product, or the necessity of land filling.

PUR, a small but growing material segment for instrument panel skins, overcomes the deficiency of plasticizer migration, but is expensive, in many instances still requires an over coat for gloss control, and is not compatible with most of the materials of construction for the instrument panel, resulting in difficulty in recycling.

A TPO, in this case consisting of a compounded or reactor blend of polypropylene and olefin rubber, which addresses the issues of P-PVC and PUR with regard to plasticizer migration, cost, and recycling, brings with it a weakness in mar resistance. The current technology for TPO instrument panel skins utilizes a coating to achieve the required scuff and mar resistance properties. Additionally, an adhesion promoter is required to allow the coating to bond properly, which makes it a costly and time-consuming requirement to achieve adequate mar resistance. These types of blends are disclosed in U.S. Pat. No. 4,871,810 and U.S. Pat. No. 4,968,752, but the different blends of these patents are either too hard or poor in abrasion resistance compared to the blends of the present invention. U.S. Pat. No. 5,206,294 discloses a TPO material for instrument panel skins of allegedly improved abrasion resistance, but has had only limited commercial success due to inadequate performance in this regard.

There obviously remains a need in the market for a thermoplastic material which offers the recycling benefits provided by an olefin, but with the mar resistance, feel, and useful service temperature range of P-PVC and PUR resins, and which can provide a uniform grain definition and controlled low gloss appearance without the need for applied coatings. Additionally, an ability to co-extrude this material in combination with other solid and foamed alpha-olefins, without requiring adhesives or tie layers, where a low cost substrate layer can be balanced with an improved functional top layer to minimize cost or maximize physical properties, would offer a broad latitude in product design flexibility and manufacture. Such a material would provide significant design, manufacture, and environmental benefits for automotive interior applications, especially for instrument panel skins. The provision of the blend or alloy of the present invention goes far toward satisfying this obvious need and its many-faceted requirements.

GENERAL DESCRIPTION OF THE PRESENT INVENTION

The present invention relates to a thermoplastic polymer blend comprising (A) a thermoplastic ionomer, (B) a rubber, especially a cross-linked ethylene-propylene-diene thermoplastic elastomer or an equivalent polyolefin copolymer such as ethylene-butene, hexene, or octene, or an acrylonitrile-butadiene or styrene-butadiene elastomer, or a styrene acrylonitrile graft-crosslinked polybutadiene, and (C) a thermoplastic polypropylene or polyethylene homopolymer or copolymer, which blend exhibits numerous advantageous characteristics and properties in its various use applications, such as in injection molding or extrusion and thermoforming.

The blend composition of the present invention exhibits excellent weatherability, mar resistance, low temperature flexibility and is readily recyclable. The material is also co-extrudable with other alpha-olefins without requiring adhesives or tie layers and offers the advantage of being integrally colored or colorable with low gloss.

Although the blend of the present invention is suitable for injection molding, co-injection molding, blow molding, profile extrusion, sheet extrusion and vacuum forming, it is preferably employed for sheet extrusion and vacuum forming. Further, representative applications of the blend of the present invention are for handles, push buttons, "soft touch" over molded products such as grips, cable jackets, decorative trim, and sheet cover stock, but preferably for automotive instrument panel skins.

In addition, the compositions of the invention, which are remarkably well suited for use as the "top-coat" of co-extruded sheetings, may also be employed for the production of specific injection molded parts, where the lower cost and physical properties of the composition of the invention are suited to the specific end use.

OBJECTS OF THE INVENTION

It is an object of the present invention to provide thermoplastic ionomer blends or alloys which exhibit advantageous properties upon extrusion or molding, especially upon injection molding or sheetform extrusion and thermoforming. It is another object of the invention to provide such blends which comprise three essential components A, B, and C, which are further identified herein. It is an additional object of the invention to provide such blends or alloys comprising components A, B, and C in particular proportions, and the ionomer component thereof having particular weight percent ranges of alpha-olefin units and alpha, beta-ethylenically unsaturated carboxylic acid units, as well as particular and preferred degrees of neutralization of the carboxylic acid units with metal ions.

It is a further object of the invention to provide such thermoplastic blends or alloys which provide specific advantageous properties upon being molded or extruded. It is a still further object of the invention to provide such thermoplastic ionomer blends or alloys which possess ready recyclability and colorability with low gloss, excellent weatherability, mar resistance, low-temperature flexibility, and coextrudability with other alpha-olefins without requiring adhesives or tie layers. Yet another object of the invention is the provision of molded products produced by molding of a thermoplastic ionomer blend of the present invention, especially injection molded parts or products. Still an additional object of the present invention is the provision of extruded parts or products and especially extruded sheetform and thermoformed parts or products made by extruding and optionally also thermoforming a thermoplastic ionomer blend of the present invention. Still further objects will be obvious to one skilled in the art and still additional objects will become apparent from the present disclosure.

SUMMARY OF THE INVENTION

What we believe to be our invention, then, inter alia, comprises the following, singly or in combination:

A thermoplastic ionomer blend or alloy composition exhibiting advantageous properties upon molding or extrusion and/or thermoforming, consisting essentially of the following components:

A. about 15 to 85 parts by weight of a thermoplastic copolymer containing about 91 to 80 weight percent of alpha-olefin units and about 9 to 20 weight percent of alpha, beta-ethylenically unsaturated carboxylic acid units, said carboxylic acid units being about 20 to 90 percent neutralized with metal ions, B. about 10 to 80 parts by weight of a rubber which is a thermoplastic elastomer selected from the group consisting of (a) crosslinked ethylene-propylenediene copolymers, and equivalent polyolefin copolymers, e.g., ethylene-alkene copolymers such as ethylene-butene, hexene, or octene, (b). acrylonitrile-butadiene copolymers, (c) styrene-butadiene copolymers, and (d) styrene acrylonitrile graft crosslinked polybutadiene rubbers, and C. about 5 to 40 parts by weight of a thermoplastic polymer selected from the group consisting of polyethylene and polypropylene copolymers and homopolymers, the total number of parts being 100, the blend when molded or extruded and/or thermoformed into a thermoplastic product providing properties in the following ranges:

| | |
|---|---|
| Specific Gravity | 0.82–1.1 |
| Tensile Strength | 800–6500 PSI |
| % Elongation | 10–800% |
| Flexural Modulus | 500–90,000 PSI |
| Tear Resistance | 10 N/mm minimum |
| 60 Degree Gloss of Molded Plaque | 80 max. | such a composition wherein, in A, the alpha-olefin comprises ethylene, the unsaturated acid is acrylic or methacrylic, and the metal ions are zinc or sodium ions; wherein, in B, the thermoplastic elastomer comprises an ethylene-polypropylene-diene copolymer; and wherein, in C, the thermoplastic polymer comprises polypropylene;

such a composition wherein, in A, carboxylic acid units are neutralized with zinc ions;

such a composition wherein, in A, the carboxylic acid units are about 20–90% neutralized with zinc ions;

such a composition wherein A is present in about 45 to 55 percent by weight, B is present in about 30 to 40 percent by weight, and C is present in about 5 to 15 percent by weight;

such a composition wherein A is present in about 50 to 55 percent by weight, B is present in about 35 to 40 percent by weight, and C is present in about 5 to 10 percent by weight;

such a composition wherein the properties are as follows:

| | |
|---|---|
| Specific Gravity | 0.82–1.0 |
| Tensile Strength | 2000 PSI min. |
| % Elongation | 200% min. |
| Flexural Modulus | 15,000–35000 PSI |
| Tear Resistance | 20 N/mm min. |
| 60 Degree Gloss of Molded Plaque | 10 max. |
| Fogging No. @ 110C | 60 min. |
| Scratch Resistance | 2 max on all loads |
| Grain retention (Visual Inspection) | No noticeable loss after thermoforming. | such a composition wherein B is a crosslinked ethylene-propylene-diene copolymer dispersed in a polypropylene matrix;

such a composition wherein A contains about 9 to 12 weight percent of alpha, beta-ethylenically unsaturated carboxylic acid units, which units are about 20 to 90 percent neutralized with zinc ions;

such a composition wherein A contains about 9 to 12 weight percent of alpha, beta-ethylenically unsaturated carboxylic acid units, which units are about 35 to 80 percent neutralized with zinc ions; and such a composition wherein B, the crosslinked ethylene-propylene-diene copolymer, is dispersed in a polypropylene matrix and A contains about 9 to 12 weight percent of alpha, beta-ethylenically unsaturated carboxylic acid units, which units are about 60 to 80 percent neutralized with zinc ions.

Also, an injection-molded product made by injection molding such a composition, a sheetform product made by extrusion and/or thermoforming of such a composition, and moreover a co-extrusion of an alpha-olefin and such a thermoplastic blend. Finally, a thermoformed instrument panel skin made from such a composition.

IN GENERAL

In general, the components of the blend of the present invention are admixed together using standard mixing practices, as in and through a Banbury™ or other suitable extruder, e.g., a twin-screw extruder, for enhancing complete admixture of the components and to give a homogenous dispersion of the components throughout the blend. The final admixture may thereafter be pelleted or cubed, and processed according to normal procedure by injection molding or extrusion and if desired also thermoforming.

The components employed according to the present invention are well-known in the art and their composition and manufacture do not constitute any part of the present invention, except as the proportions may or may not effect the desirable properties in the ultimate blend or alloy.

The thermoplastic resin composition of the present invention may as usual contain additionally, as required or desired, various additives such as inorganic fillers, antioxidants, UV absorbers, light protectants, heat-resistant stabilizers, pigments, dyes, and the like in minor proportions, e.g., up to a total of 10 percent of the total weight of the blend, although ordinarily not more than about 5 percent of the total weight of the blend, and usually not more than one or two percent by weight of the total blend. Inorganic fillers may include, for example, silica, talc, calcium carbonate, diatomaceous earth, and the like. Processing stabilizers and color concentrates are available in the trade and may be employed if desired. Additional additives may include silicone oil or small amounts of an epoxy resin. For example, the gloss of the final product can be lowered by adding into the blend an additional material such as a propylene homopolymer or a bi-functional epoxy which forms a crosslink network between the ionomer molecules and lowers the gloss and increases viscosity and heat resistance. Such ingredients are indicated in the following Examples (Table II) where they have been employed as an additament to the blend of the present invention.

The starting materials for the blend of the present invention comprise about 15 to 85 parts by weight of A, about 10 to 80 parts by weight of B, and about 5 to 40 parts by weight of C, with 45 to 55 weight percent of A, 30 to 40 weight percent of B, and 5 to 15 weight percent of C being preferred, and especially 50 to 55 weight percent of A, 35 to 40 weight percent of B, and 5 to 10 weight percent of C.

The ionomer A of choice is an ethylene and methacrylic or acrylic acid copolymer having about 9 to 20, preferably about 9 to 12, weight percent of methacrylic or acrylic acid units partially neutralized by zinc or sodium metal ions, preferably zinc ions, the percentage of carboxylic acid units neutralized being about 20 to 90 percent, preferably 30 to 80 percent, and most preferably about 60 to about 80 percent. Component B is preferably a fully vulcanized or crosslinked EPDM, which may or may not be plasticized, and is preferably dispersed in a polypropylene matrix providing a rubber concentrate, whereas component C is preferably a polypropylene homopolymer.

Such starting or raw materials are readily available on the open market. For example, Component A can advantageously comprise Surlyn™ 9520 from DuPont, although other Surlyn™ or Iotek™ ionomers having the defined characteristics can also be used, for example, Surlyn™ 9650, 9020, 9450, 9720, 9730 and Exxon Iotek™ 7010, 7020, or 7030. Component B can advantageously comprise one of the RC 8000 series, plasticized or not plasticized, from Advanced Elastomer Systems, although other crosslinked and non-crosslinked EPDMs, EPMs, and other rubbers or elastomers may be employed, such as Engage™ 8100, Nordel™ 2722, or Flexomer™ DFDB-1085, respectively an ethylene-octene copolymer from DuPont Dow; an ethylene-propylene-1,4-hexadiene copolymer from DuPont Dow; and an ethylene based EPM from Union Carbide. Component B may also be or comprise Chemigum™ P86F, a cross-linked acrylonitrile copolymer from Goodyear; Stereon™, a styrene-butadiene thermoplastic elastomer from Firestone; or Blendex™ 338, a styrene acrylonitrile graft-crosslinked polybutadiene rubber from GE; Component C can advantageously comprise 6400P polypropylene from Amoco, although other PE or PP homopolymers or copolymers may also be used, such as a 10 or 0.7 melt HDPE.

In practice, blends comprising about 52 percent by weight of such ionomer A, about 38 percent by weight of such component B, and about 10 percent of such component C have been found to provide optimum properties in products molded or extruded therefrom, especially injection molded products and sheetform products prepared therefrom by extrusion and thermoforming.

If desired, an amount of colored pigment, advantageously about 1.5 to 5 percent by weight, can be incorporated in the blend of the present invention, and in such case, when the coloring is not provided by carbon black, it is frequently desirable to include an ultraviolet stabilizer, such as an ultraviolet absorber or the like, in an effective amount, usually up to about 1.0 percent, and as a processing stabilizer advantageously 0.1 to 0.2 percent of an antioxidant. Suitable such pigments, ultraviolet stabilizers, and antioxidants are well known in the art and commonly used in connection with pigments for ionomers and need not be further described in connection with the present invention.

The EPDM which is preferably employed as Component B according to the present invention is an ethylene-propylene-non-conjugated diene rubber, which is a terpolymer of ethylene, propylene, and a non-conjugated diene such as 1,4-hexadiene, ethylidene norbornene, or dicyclopentadiene. Such EPDM products are ordinarily obtained by copolymerizing ethylene and propylene in proportions of about 60–85 percent ethylene and 15–40 percent propylene, advantageously 65–82 percent ethylene and 18–35 percent propylene, and the inclusion of a minor amount, usually up to about 5 percent, of the selected diene as previously identified, which more broadly may be a 1,4-hexadiene, norbornene, an alkylidene norbornene, an alkenyl norbornene, or dicyclopentadiene. As already stated, a product of the RC 8000 series from Advanced Elastomer Systems, which is an EPDM or ethylene copolymer, plasticized or not plasticized, dispersed in a PP matrix and considered a rubber concentrate, has been found to fill the requirements for a suitable starting material B according to the present invention. As already stated, other rubbers suitable as starting material B according to the present invention include styrene-butadiene rubbers such as Stereon™ 841 from Firestone, styrene acrylonitrile graft-crosslinked polybutadiene rubbers such as Blendex™ 338 from GE Specialty Chemicals, and cross-linked nitrile-butadiene rubbers such as Chemigum™ P86F from Goodyear.

Suitable ionic copolymers A are prepared by copolymerizing an alpha-olefin and an alpha, beta-ethylenically unsaturated carboxylic acid, such as acrylic or methacrylic acid, and are available on the market from E.I. DuPont de Nemours under the trademark SURLYN™ or Exxon Corp. under the tradename Iotek™. The composition of these polymers can vary considerably, as to the number of ethylene or other alpha-olefin units and carboxylic acid containing units. Generally the olefin units are derived from ethylene and the carboxylic acid-containing units from methacrylic acid or acrylic acid. For purposes of the present invention it is advantageous to have the copolymer contain about 91 to 80 weight percent of alpha-olefin units and about 9 to 20 (preferably about 9 to 11) weight percent of alpha, beta-ethylenically unsaturated carboxylic acid units, and for the carboxylic acid units to be partially neutralized with metal ions, i.e., at least 20 percent neutralized with metal ions, preferably about 20 to 90 percent neutralized with metal ions, the said metal ions preferably being zinc or sodium, especially zinc.

As to component C, it is preferably present in about 5 to 40 parts by weight of the total blend, especially 5 to 15 percent by weight and most especially 5 to 10 percent by weight of the total blend, and is a thermoplastic polyethylene or polypropylene homopolymer or copolymer. The polypropylene product PP 10-6400 from Amoco has been found admirably suitable for the purposes of the present invention.

As already stated, another source of the Component B EPDM is E.I. DuPont de Nemours and Company, Inc., from whom suitable products can be obtained under the trademark NORDEL™ varying in hardness between about 55 and 65 Mooney ML, which products are ethylene-propylene rubbers which are modified by a minor amount, up to about 5 percent, of 1,4-hexadiene monomer. Representative Component B ethylene-propylene rubbers EPR and EPDM are disclosed in U.S. Pat. Nos. 3,658,752, 3,758,643, and 4,078,020.

Representative Component A ionomers are disclosed in U.S. Pat. Nos. 3,845,163, 4,010,222, as well as U.S. Pat. Nos. 2,599,123 and 3,264,272 and Belgian Patent 818609 and can be made either by copolymerization or graft copolymerization as disclosed in U.S. Pat. No. 4,010,222.

DETAILED DESCRIPTION OF THE INVENTION

In brief, then, the ranges of components of the blend of the present invention are as follows:

(A) Ionomer—15 to 85 parts
(B) Rubber—10 to 80 parts
(C) Polyethylene and/or polypropylene homopolymer or copolymer—5 to 40 parts, the total number of parts being 100.

An especially preferred composition of the present invention, particularly suitable for instrument panel skin application and use, comprises the following components blended together:

Surlyn™ 9520—about 52%
RC 8001—about 38%
Polypropylene 10-6400—about 10%

An especially preferred blend of the foregoing components includes an epoxide such as Epon 1002F (Shell) in the amount of about 0.5%–1.0% and a silicone polymer dispersed in polypropylene such as Dow Corning MB 50-001 in the approximate amount of 3%.

With respect to the properties of the end product, namely, the molded or extruded and/or thermoformed products, the following Table I lists the "broad" range and "specific" range for material property requirements, with the "Specific Range" being especially suitable for extruded and thermoformed skins:

TABLE I

| | "Broad" Range | "Specific" Range |
|---|---|---|
| Specific Gravity | 0.82–1.1 | 0.82–1.0 |
| Tensile Strength | 800–6500 PSI | 2000 PSI min. |
| % Elongation | 10–800% | 200% min. |
| Flexural Modulus | 500–90,000 PSI | 15,000–35000 PSI |
| Tear Resistance | 10 N/mm minimum | 20 N/mm min. |
| 60 Degree Gloss of Molded Plaque | 80 max. | 10 max. |
| Fogging No. @ 110C | | 60 min. |
| Scratch Resistance | | 2 max on all loads |
| Grain retention (Visual Inspection) | | No noticeable loss after thermoforming. |

PROCEDURE FOR MELT BLENDING AND TESTING THE BLENDS OF THE PRESENT INVENTION

The alloy compositions of the present invention are generally prepared by melt blending the polymeric components under high shear conditions, for example in an extruder. The various ingredients may first be combined with one another, e.g., in a pellet blend, or they may be combined with one another via simultaneous or separate metering of the various components. They may also be divided and blended in one or more passes into separate sections of the mixing equipment.

The procedure is sometimes referred to as "dynamic heat treatment" of the blend by which is meant the high-shear kneading of the blend in molten condition, as in an extruder, to attain a composition of the invention in the form of a reaction product, namely, a thermoplastic melt blend or polymer alloy of the starting components.

The resultant compositions may be formed into sheets, or they may be molded into any desired shape. In particular, they may be thermoformed for use as instrument panel skins for automobiles. Excellent low temperature flexibility combined with scuff resistance, and high temperature resistance, enables these compositions to be useful in applications wherein a wide range of temperature and abrasive conditions are encountered.

The following are the steps followed in blending and testing each formulation.

1. The starting components were weighed into a polyethylene bag and tumble-mixed to obtain a homogenous dry blend. The blend was then melt blended in a Leistritz™ twin screw extruder having a diameter of 34 mm and a length to diameter ratio of 30. The extruder was operated under the following conditions:

| Screw Speed rpm | Zone 1 temp. (C°) | Zone 2–4 temp. (C°) | Zone 5–9 temp. (C°) | Die temp. (C°) |
|---|---|---|---|---|
| 240 | 100 | 180–200 | 200–210 | 210 |

Resin was extruded at a rate of 24 pounds/hour with a melt temperature of 220° C. The melt strands were quenched in water and pelletized.

2. The pellets obtained were then used for injection molding ASTM test specimens and the physical properties tested. The specimens were molded on an 85 ton Battenfeld™ under the following conditions:

Mold temperature—30° C.

Melt temperature—220° C.

Overall cycle time—40 sec.

3. Blends were extruded into sheet stock, for physical property and thermoforming evaluations, on a cast sheet extrusion line. The line consisted of a 2.5 inch single screw primary extruder with two 1.5 inch satellite extruders feeding into a manifold block, allowing a sheet construction of up to five layers. The melt streams from the manifold block then fed into a 30 inch coat hanger sheet die, exiting into a 3 roll stack to emboss a grain, cool, and maintain dimensionals.

The following variations were extruded:

Single layer of present invention blend that was approximately 0.040–0.060 inch thick.

Two-layer sheet with the blend of the present invention representing the top embossed layer (0.010–0.020 inch), in combination with a base layer of flexible thermoplastic olefin or TPO (0.020–0.040 inch).

Three-layer sheet with the blend of the present invention representing the top embossed layer (0.010–0.020 inch) with a core composition of flexible TPO (0.010–0.020 inch) and a base composition of sheet trim scrap (0.010–0.020 inch).

Two-layer sheet with the blend of the present invention representing the top embossed layer (0.010–0.020 inch) and the base layer being a 50/50 blend of flexible TPO/sheet trim scrap (0.020–0.040 inch).

Representative extrusion temperatures for the blend of the present invention and the flexible TPO were as follows:

| Rear Zone C | Rear Middle C | Front Middle C | Front Zone C | Adapter C | Manifold C | Die C |
|---|---|---|---|---|---|---|
| 170–204 | 170–215 | 180–215 | 180–220 | 180–220 | 190–200 | 190–220 |

Top, Center and Bottom Chill Rolls were at 50–75 C.

4. The sheet stock was thermoformed and evaluated for grain retention, uniformity of sheet thickness, and change in gloss after thermoforming. The material underwent a preliminary screening in the lab by heating extruded sheet to 300° F., hand stretching it, and holding it for 30 sec. Gloss measurements were taken before and after the stretching. Samples were also thermoformed on a laboratory single stage thermoformer with radiant heaters positioned over and under the sheet stock. A single sheet approximately 20×20 cm was mounted into a clamp frame. Upon heating the sheet stock to the desired temperature of 140–180° C., the sheet was moved into position over an aluminum female funnel mold with a 60 degree angle and vacuum formed. A draw ratio of approximately 1.15 to 1 (diameter to depth) ratio was used. The formed part was air cooled and then removed for evaluation. Materials were evaluated for uniformity of sheet thickness of the formed part, percentage of surface gloss increase/reduction of the formed part vs. the sheet stock, and a visual rating of grain retention against quantitative grain standards. The thermoformed sheets were found to be particularly suitable for use as instrument panel skins, especially those having properties falling within the "Specific" range of properties as set forth in the foregoing.

5. Sanding block grips were injection molded on a Van Dorn™ apparatus under the following conditions:

| | |
|---|---|
| Temperature: | 200° C. |
| Injection Pressure: | 1300 Psi |
| Pack Pressure: | 1200 Psi |
| Mold Temperature: | 30° C. |
| Overall cycle time: | 147 sec. |

The molded grips are characterized by all of the desirable properties set forth in the foregoing under the heading "Broad Range" and, when the preferred components are employed on the preferred proportions, also under the heading "Specific Range".

EXAMPLES

The following Examples 1 through 28 are given by way of illustration only, and are not to be construed as limiting.

The following Table II presents the starting blend components, the parts of each component, and the properties of the resulting molded or extruded and/or thermoformed product for each of the qualifying Examples 1 through 28, also listed as runs 30 through 34, 36–38, 43, 45–60, and 63 through 65.

TABLE II

IONOMER/RUBBER/POLYOLEFIN BLEND RANGES AND PROPERTIES

| EXAMPLE | | 1 | 2 | 3 | 4 | 5 | 6 | 7 | 8 |
|---|---|---|---|---|---|---|---|---|---|
| FORMULATION | | FX 226 | FX 226 | FX 226 | FX 226 | FX 226 | FX 226 | FX 226 | FX 226 |
| REQUIREMENTS | | −30 | −31 | −32 | −33 | −34 | −36 | −37 | −38 |
| INGREDIENTS | | | | | | | | | |
| SURLYN 9520 | | 48 | 53 | 48 | 53 | 48 | 51 | 50.5 | 50 |
| RC 8001 | | 38 | 38 | 38 | 38 | 38 | 38 | 38 | 38 |
| PP 10-6400 | | | | | 5 | 10 | 10 | 10 | 10 |
| (4 MELT HOMOPOLYMER) | | | | | | | | | |
| COLOR CONCENTRATE | | 3 | 3 | 3 | 3 | 3 | | | |
| 10 MELT HDPE | | 10 | | | | | | | |
| 0.7 MELT HDPE | | | 5 | 10 | | | | | |
| STABILIZERS | | 1 | 1 | 1 | 1 | 1 | 1 | 1 | 1 |
| EPON 1002F | | | | | | | | 0.5 | 1 |
| WOLLASTONITE | | | | | | | | | |
| NYGLOSS 8 10013 | | | | | | | | | |
| DOW SILICONE MB 25-501 | | | | | | | | | |
| DOW SILICONE MB 50-001 | | | | | | | | | |
| MYTEX TPO | | | | | | | | | |
| | | 100 | 100 | 100 | 100 | 100 | 100 | 100 | 100 |
| TESTING REQUIREMENTS | METHOD | | | | | | | | |
| MELT FLOW RATE, COND. 'E', G/10 MIN | ASTM D1238 | 0.8012 | 0.9464 | 0.9541 | 1.547 | 1.654 | 1.40 | 0.34 | 0.01 |
| DENSITY | ASTM D792 | 0.9354 | 0.9371 | 0.9366 | 0.9381 | 0.93813 | 0.94 | 0.93 | 0.94 |
| TENSILE @ PEAK, 2"/MIN, PSI | ASTM D412 | 2402 | 2352 | 2588 | 2285 | 2425 | 2523 | 2624 | 2365 |
| % ELONGATION, 2"/MIN | ASTM D412 | 192.4 | 221.3 | 238.2 | 198.4 | 225.5 | 245.8 | 174.9 | 134.7 |
| FLEX MODULUS, 0.05"/MIN, 2" SPAN, PSI | ASTM D790 | 16851 | 15501 | 15240 | 16270 | 19361 | 20142 | 23052 | 25383 |
| GARDNER IMPACT @ −30° C., J | ASTM D5420 | 30 | 31 | 28 | 31 | 32 | 32.20 | 31.10 | 30.00 |
| TROUSER TEAR N/mm | ASTM D624 | 22 | 22 | 23 | 23 | 23 | 25.80 | 57.67 | 39.40 |
| HARDNESS SHORE A, 15 SEC DELAY | ASTM D2240 | 91 | 90 | 89 | 93 | 93 | 91.10 | 92.20 | 92.90 |
| MOLD SHRINK, % WITH FLOW | ASTM D955 | 1.0 | 1.0 | 1.0 | 1.0 | 0.7 | 0.81 | 1.28 | 1.50 |
| MOLD SHRINK, % ACROSS FLOW | ASTM D955 | 2 | 1 | 1 | 1 | 1 | 1.05 | 1.42 | 1.44 |
| 60 DEGREE GLOSS OF TAPE EXTRUSION % | ASTM D523 | 1.9 | 2 | 2.1 | 3.5 | 2.2 | 6.3 | 4.9 | 2.5 |
| 60 DEGREE GLOSS OF MOLDED PLAQUES SMOOTH | ASTM D523 | 12.3 | 8.58 | 12.8 | 8.9 | 9.17 | 12.2 | 5.9 | 7 |
| FOGGING NUMBER | GM 9305 | | | | | | 70 | | 75.5 |
| SCRATCH RESIST: 1 MM SCRATCH PIN, | FLTM BN108-13 | | | | | | | | |
| LOAD = 0.6N | | | | | | | 1 | 2 | 1 |
| LOAD = 2.0N | | | | | | | 2 | 2 | 2 |
| LOAD = 3.0N | | | | | | | 2 | 2 | 2 |
| LOAD = 6.0N | | | | | | | 2 | 3 | 2 |
| LOAD = 7.0N | | | | | | | 2 | 4 | 2 |

| EXAMPLE | 9 | 10 | 11 | 12 | 13 | 14 | 15 | 16 |
|---|---|---|---|---|---|---|---|---|
| FORMULATION | FX 226 | FX 226 | FX 226 | FX 226 | FX 226 | FX 226 | FX 226 | FX 226 |
| REQUIREMENTS | −43 | −45 | −46 | −47 | −48 | −49 | −50 | −51 |
| INGREDIENTS | | | | | | | | |
| SURLYN 9520 | 47 | 48 | 49 | 48 | 48.5 | 84 | 64 | 54 |
| RC 8001 | 37 | 37 | 37 | 37 | 37 | 10 | 20 | 20 |
| PP 10-6400 | 10 | 10 | 10 | 10 | 10 | 5 | 15 | 25 |
| 10 MELT HDPE | | | | | | | | |
| 0.7 MELT HDPE | | | | | | | | |
| STABILIZERS | 1 | 1 | 1 | 1 | 1 | 1 | 1 | 1 |
| EPON 1002F | | | | 1 | 0.5 | | | |
| WOLLASTONITE | 5 | | | | | | | |
| NYGLOSS 8 10013 | | | | | | | | |
| DOW SILICONE MB 25-501 | | 4 | | | | | | |
| DOW SILICONE MB 50-001 | | | 3 | 3 | 3 | | | |
| | 100 | 100 | 100 | 100 | 100 | 100 | 100 | 100 |

TABLE II-continued

IONOMER/RUBBER/POLYOLEFIN BLEND RANGES AND PROPERTIES

| TESTING REQUIREMENTS | METHOD | | | | | | | |
|---|---|---|---|---|---|---|---|---|
| MELT FLOW RATE, COND. 'E', G/10 MIN | ASTM D1238 | 1.476 | 1.16 | 1.17 | 0.01 | 0.31 | 1.57 | 1.41 | 1.95 |
| DENSITY | ASTM D792 | 0.958 | 0.9375 | 0.938 | 0.93 | 0.936 | 0.942 | 0.923 | 0.934 |
| TENSILE @ PEAK, 2"/MIN, PSI | ASTM D412 | 2415 | 2478 | 2871 | 1784 | 2750.36 | 4291 | 6163 | 2881 |
| % ELONGATION, 2"/MIN | ASTM D412 | 219.3 | 342.76 | 235.033 | 137.7 | 321.76 | 53 | 189 | 351 |
| FLEX MODULUS, 0.05"/MIN, 2" SPAN, PSI | ASTM D790 | 22559 | 19834 | 20712 | 20776 | 25962 | 29032 | 33699 | 44459 |
| GARDNER IMPACT @ −30° C., J | ASTM D5420 | 32 | 29 | 25 | 25 | 25.12 | 36.4 | 36.4 | 34.5 |
| TROUSER TEAR N/mm | ASTM D624 | 39 | 39 | 36.93 | 20.2 | 24.4 | 40.51 | 44 | 52 |
| HARDNESS SHORE A, 15 SEC DELAY | ASTM D2240 | 92 | 92 | 90.6 | 89.4 | 90.1 | 93 | 93 | 93.6 |
| MOLD SHRINK, % WITH FLOW | ASTM D955 | 0.9 | 1.3 | 0.8625 | 0.9515 | 0.895 | 0.48888 | 0.4333 | 0.2583 |
| MOLD SHRINK, % ACROSS FLOW | ASTM D955 | 1 | 1 | 1.14 | 1.201 | 1.194 | 1.3083 | 1.0791 | 0.4875 |
| 60 DEGREE GLOSS OF TAPE EXTRUSION % | ASTM D523 | 5.5 | 5.2 | 4.7 | 1.5 | 2.3 | | | |
| 60 DEGREE GLOSS OF MOLDED PLAQUES SMOOTH | ASTM D523 | 12.6 | 10.7 | 10.9 | 5.9 | 7.7 | 52.7 | 37.3 | 41 |
| FOGGING NUMBER | GM 9305 | | 95 | 90 | 89 | 87 | | | |
| SCRATCH RESIST: 1 MM SCRATCH PIN, | FLTM BN108-13 | | | | | | | | |
| LOAD = 0.6 | | 2 | 1 | 1 | 1 | 1 | | | |
| LOAD = 2.0 | | 2 | 1 | 1 | 1 | 1 | | | |
| LOAD = 3.0 | | 2 | 2 | 1 | 1 | 1 | | | |
| LOAD = 6.0 | | 2 | 2 | 2 | 1 | 1 | | | |
| LOAD = 7.0 | | 3 | 2 | 2 | 1 | 1 | | | |

| EXAMPLE | | 17 | 18 | 19 | 20 | 21 | 22 | 23 | 24 |
|---|---|---|---|---|---|---|---|---|---|
| FORMULATION REQUIREMENTS | | FX 226 -52 | FX 226 -53 | FX 226 -54 | FX 226 -55 | FX 226 -56 | FX 226 -57 | FX 226 -58 | FX 226 -59 |
| INGREDIENTS | | | | | | | | | |
| SURLYN 9520 | | 49 | 39 | 25 | 25 | 15 | 15 | 51 | 51 |
| RC 8001 | | 10 | 35 | 49 | 59 | 44 | 79 | | |
| PP 10-6400 | | 40 | 25 | 25 | 15 | 40 | 5 | 10 | 10 |
| 10 MELT HDPE | | | | | | | | | |
| 0.7 MELT HDPE | | | | | | | | | |
| STABILIZERS | | 1 | 1 | 1 | 1 | 1 | 1 | 1 | 1 |
| BLENDEX 338 | | | | | | | | 38 | |
| CHEMIGUM | | | | | | | | | 38 |
| STEREON 841A | | | | | | | | | |
| EPON 1002F | | | | | | | | | |
| WOLLASTONITE | | | | | | | | | |
| NYGLOSS 8 10013 | | | | | | | | | |
| DOW SILICONE MB 25-501 | | | | | | | | | |
| DOW SILICONE MB 50-001 | | | | | | | | | |
| | | 100 | 100 | 100 | 100 | 100 | 100 | 100 | 100 |

| TESTING REQUIREMENTS | METHOD | | | | | | | | |
|---|---|---|---|---|---|---|---|---|---|
| MELT FLOW RATE, COND. 'E', G/10 MIN | ASTM D1238 | 2.35 | 1.81 | 1.73 | 1.08 | 2.24 | 0.13 | 0.09 | 0.131 |
| DENSITY | ASTM D792 | 0.93 | 0.927 | 0.919 | 0.92 | 0.914 | 0.914 | 0.948 | 0.964 |
| TENSILE @ PEAK, 20"/MIN, PSI | ASTM D412 | 3086 | 2296 | 2085 | 1732 | 1756 | 1097 | 2757 | 3723 |
| % ELONGATION, 20"/MIN | ASTM D412 | 356 | 359 | 347 | 310 | 525 | 201 | 131 | 128 |
| FLEX MODULUS, 0.05"/MIN, 2" SPAN, PSI | ASTM D790 | 76164 | 35945 | 32385 | 20385 | 44234 | 11795 | 52289 | 40164 |
| GARDNER IMPACT @ −30° C., J | ASTM D5420 | 5 | 33 | 29 | 25 | 32 | 17 | 34 | 2.7 |
| TROUSER TEAR N/mm | ASTM D624 | 27 | 38 | 45 | 29 | 52 | 34 | 30 | 36.7 |
| HARDNESS SHORE A, 15 SEC DELAY | ASTM D2240 | 94 | 95 | 92 | 90 | 94 | 80 | 95 | 91.4 |
| MOLD SHRINK, % WITH FLOW | ASTM D955 | 0.394 | 0.537 | 0.669 | 0.733 | 1.031 | 1.542 | 0.642 | 0.686 |
| MOLD SHRINK, % ACROSS FLOW | ASTM D955 | 0.525 | 0.783 | 0.792 | 0.929 | 1.138 | 1.275 | 0.963 | 1.246 |
| 60 DEGREE GLOSS OF TAPE EXTRUSION % | ASTM D523 | | | | | | | | |

TABLE II-continued

IONOMER/RUBBER/POLYOLEFIN BLEND RANGES AND PROPERTIES

| | | | | | | | | |
|---|---|---|---|---|---|---|---|---|
| 60 DEGREE GLOSS OF MOLDED PLAQUES SMOOTH | ASTM D523 | 55.9 | 15.8 | 8.3 | 10.2 | 10.4 | 4.5 | 33.6 | 20.3 |
| FOGGING NUMBER | GM 9305 | | | | | | | | |

| EXAMPLE | | 25 | 26 | 27 | 28 | | | | |
|---|---|---|---|---|---|---|---|---|---|
| FORMULATION REQUIREMENTS | | FX 226 -60 | FX 226 -63 | FX 226 -64 | FX 226 -65 | FX 226 | FX 226 | FX 226 | FX 226 |

| INGREDIENTS | | | | | |
|---|---|---|---|---|---|
| SURLYN 9520 | | 51 | | | |
| SURLYN 9650 | | | 36 | | |
| SURLYN 9020 | | | | 49 | |
| SURLYN 9730 | | | | | 49 |
| RC 8001 | | | | | |
| PP 10-6400 | | 10 | | 5 | |
| LS 5560 HDPE | | | 48 | | |
| HDPE 6706 | | | | | 30 |
| STABILIZERS | | 1 | 1 | 1 | 1 |
| STEREON 841A | | 38 | | | |
| ENGAGE 8100 | | | 15 | | |
| NORDEL 2722 | | | | 45 | |
| FLEXOMER DFDB-1085 | | | | | 20 |
| | | 100 | 100 | 100 | 100 |

| TESTING REQUIREMENTS | METHOD | | | | |
|---|---|---|---|---|---|
| MELT FLOW RATE, COND. 'E', G/10 MIN | ASTM D1238 | 0.12 | 4.7 | 1.2 | 1.9 |
| DENSITY | ASTM D792 | 0.946 | 0.93 | 0.927 | 0.93 |
| TENSILE @ PEAK, 2"/MIN, PSI | ASTM D412 | 3833 | 2902 | 1560 | 3360 |
| % ELONGATION, 2"/MIN | ASTM D412 | 165 | 689 | 198 | 380 |
| FLEX MODULUS, 0.05"/MIN, 2" SPAN, PSI | ASTM D790 | 40417 | 55732 | 11388 | 38000 |
| GARDNER IMPACT @ -30° C., J | ASTM D5420 | 34 | 36 | 26 | 36 |
| TROUSER TEAR N/mm | ASTM D624 | 69 | 137 | 89 | 122 |
| HARDNESS SHORE A, 15 SEC DELAY | ASTM D2240 | 93 | 95 | 95 | 95 |
| MOLD SHRINK, % WITH FLOW | ASTM D955 | 1.150 | 1.270 | 0.890 | 1.100 |
| MOLD SHRINK, % ACROSS FLOW | ASTM D955 | 1.525 | 1.580 | 1.010 | 1.140 |
| 60 DEGREE GLOSS OF TAPE EXTRUSION % | ASTM D523 | 6.7 | 55.6 | 11.2 | 28 |
| 60 DEGREE GLOSS OF MOLDED PLAQUES SMOOTH | ASTM D523 | 16.2 | 79.7 | 40.2 | 75.6 |

It is thereby seen from the foregoing that the objects of the present invention have been accomplished and that a novel, efficient, economic, and superior thermoplastic polymer blend having decided advantages in application or use, as well as the injection molded or extruded and preferably also thermoformed products thereof, have been provided, all in accord with the Objects of the Invention and the Summary of Invention as set forth hereinbefore.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

We claim:

1. A thermoplastic ionomer blend or alloy composition exhibiting advantageous properties upon molding or extrusion and/or thermoforming, consisting essentially of the following components:

A. about 15 to 85 parts by weight of a thermoplastic copolymer containing about 91 to 80 weight percent of alpha-olefin units and about 9 to 20 weight percent of alpha, beta-ethylenically unsaturated carboxylic acid units, said carboxylic acid units being about 20 to 90 percent neutralized with metal ions, B. about 10 to 80 parts by weight of a rubber which is a thermoplastic elastomer selected from the group consisting of (a) crosslinked ethylene-propylenediene copolymers and ethylene-alkene copolymers, (b) crosslinked acrylonitrile-butadiene copolymers, (c) crosslinked styrene-butadiene copolymers, and (d) styrene acrylonitrile graft-crosslinked polybutadiene rubbers, and C. about 5 to 40 parts by weight of a thermoplastic polymer selected from the group consisting of polyethylene and polypropylene copolymers and homopolymers, the total number of parts being 100, the blend when molded or extruded and/or thermoformed into a thermoplastic product providing properties in the following ranges:

| | |
|---|---|
| Specific Gravity | 0.82–1.1 |
| Tensile Strength | 800–6500 PSI |
| % Elongation | 10–800% |
| Flexural Modulus | 500–90,000 PSI |
| Tear Resistance | 10 N/mm minimum |
| 60 Degree Gloss of Molded Plaque | 80 max. |

2. A composition of claim 1 wherein, in A, the alpha-olefin comprises ethylene, the unsaturated acid is acrylic or methacrylic, and the metal ions are zinc or sodium ions; wherein, in B, the thermoplastic elastomer comprises a crosslinked ethylene-polypropylene-diene copolymer; and wherein, in C, the thermoplastic polymer comprises polypropylene.

3. A composition of claim 2 wherein, in A, carboxylic acid units are neutralized with zinc ions.

4. A composition of claim 3 wherein, in A, the carboxylic acid units are about 20–90% neutralized with zinc ions.

5. A composition of claim 4 wherein A is present in about 45 to 55 percent by weight, B is present in about 30 to 40 percent by weight, and C is present in about 5 to 15 percent by weight.

6. A composition of claim 5 wherein A is present in about 50 to 55 percent by weight, B is present in about 35 to 40 percent by weight, and C is present in about 5 to 10 percent by weight.

7. A composition of claim 6 wherein the properties are as follows:

| | |
|---|---|
| Specific Gravity | 0.82–1.0 |
| Tensile Strength | 2000 PSI min. |
| % Elongation | 200% min. |
| Flexural Modulus | 15,000–35000 PSI |
| Tear Resistance | 20 N/mm min. |
| 60 Degree Gloss of Molded Plaque | 10 max. |
| Fogging No. @ 110C | 60 min. |
| Scratch Resistance | 2 max on all loads |
| Grain retention (Visual Inspection) | No noticeable loss after thermoforming. |

8. A composition of claim 1 wherein B is a crosslinked ethylene-propylene-diene copolymer dispersed in a polypropylene matrix.

9. A composition of claim 5, wherein B, the crosslinked ethylene-propylene-diene copolymer, is dispersed in a polypropylene matrix.

10. A composition of claim 1 wherein A contains about 9 to 12 weight percent of alpha, beta-ethylenically unsaturated carboxylic acid units, which units are about 20 to 90 percent neutralized with zinc ions.

11. A composition of claim 5 wherein A contains about 9 to 12 weight percent of alpha, beta-ethylenically unsaturated carboxylic acid units, which units are about 20 to 90 percent neutralized with zinc ions.

12. A composition of claim 1 wherein A contains about 9 to 12 weight percent of alpha, beta-ethylenically unsaturated carboxylic acid units, which units are about 35 to 80 percent neutralized with zinc ions.

13. A composition of claim 5 wherein A contains about 9 to 12 weight percent of alpha, beta-ethylenically unsaturated carboxylic acid units, which units are about 60 to 80 percent neutralized with zinc ions.

14. A composition of claim 6 wherein B, the crosslinked ethylene-propylene-diene copolymer, is dispersed in a polypropylene matrix and A contains about 9 to 12 weight percent of alpha, beta-ethylenically unsaturated carboxylic acid units, which units are about 60 to 80 percent neutralized with zinc ions.

15. An injection-molded product made by injection molding a composition of claim 1.

16. An injection-molded product made by injection molding a composition of claim 5.

17. An injection-molded product made by injection molding a composition of claim 8.

18. An injection-molded product made by injection molding a composition of claim 9.

19. An injection-molded product made by injection molding a composition of claim 14.

20. A sheetform product made by extrusion and/or thermoforming of a composition of claim 1.

21. A sheetform product made by extrusion and/or thermoforming of a composition of claim 5.

22. A sheetform product made by extrusion and/or thermoforming of a composition of claim 6.

23. A sheetform product made by extrusion and/or thermoforming of a composition of claim 8.

24. A sheetform product made by extrusion and/or thermoforming of a composition of claim 9.

25. A sheetform product made by extrusion and/or thermoforming of a composition of claim 14.

26. A co-extrusion of an alpha-olefin and a thermoplastic blend according to claim 1.

27. A co-extrusion of an alpha-olefin and a thermoplastic blend according to claim 5.

28. A co-extrusion of an alpha-olefin and a thermoplastic blend according to claim 8.

29. A co-extrusion of an alpha-olefin and a thermoplastic blend according to claim 9.

30. A co-extrusion of an alpha-olefin and a thermoplastic blend according to claim 14.

31. A thermoformed instrument panel skin made from the composition of claim 5.

32. A thermoformed instrument panel skin made from the composition of claim 7.

* * * * *